United States Patent Office 2,897,121
Patented July 28, 1959

2,897,121

PHARMACEUTICAL COMPOSITION

John G. Wagner, Kalamazoo, Mich., assignor to The Upjohn Company, Kalamazoo, Mich., a corporation of Michigan No Drawing. Application June 4, 1957
Serial No. 663,340

13 Claims. (Cl. 167—82)

This invention relates to a novel enteric composition and more particularly relates to orally administrable medicaments which are protected by a novel enteric composition.

Many medicaments useful in humans and animals are most suitably administered orally when they are enveloped in a film or coating which resists the acid and enzymes of the stomach but which allows release of the medication in the intestinal tract. Such a coating is called an enteric coating. The process of enteric coating pharmaceutical dosage forms such as tablets, pills, granules, capsules, powders and the like, is usually carried out in such a manner that a thin film of the enteric substance is formed around the dosage form. If the enteric substance is a suitable one, this thin film remains substantially intact while the medicament is in the stomach but is ruptured or dissolved when the medicament reaches the intestinal tract, thus allowing the medicament to be released in the intestinal tract.

Many of the substances now or formely used for enteric coatings imperfectly perform their function or have other disadvantages. Some are not sufficiently insoluble in the stomach. Others do not dissolve properly or rapidly enough in the intestinal tract. It is most desirable to have the enteric film rupture in the duodenum or jejunum since the greatest absorption of most medicinal substances occurs in these parts of the small intestine. It has been shown that the pH of the duodenum and the jejunum is often on the acid side, that is, below pH seven. Some substances with weakly acidic groups are not sufficiently ionized below pH seven to be soluble; and hence when such substances are used for enteric coating, the coated medicament passes through an acid upper intestine and the coating will not rupture until the medicament has reached the ileum or colon, which is undesirable. An example of a substance which probably has acidic groups of insufficient strength is shellac. Other substances such as phenylsalicylate and β-naphthylbenzoate, which have been used for enteric coating have the disadvantages that: (a) they or their hydrolysis products exert pronounced physiological action; and (b) they are unimolecular crystalline compounds which are difficult to prepare in the form of films which do not crack and which are acid-resistant for long periods of time.

It is therefore an object of this invention to provide enteric medicaments which remain intact in the stomach but disintegrate rapidly in the intestinal tract, even if the tract is acidic. It is also an object of this invention to provide enteric medicaments in which the enteric material has good resistance to acid and stomach conditions. Another object is the provision of such medicaments in which the enteric material has very low oral toxicity. A still further object is the provision of such medicaments in which the enteric material is more conveniently and economically applied. Another object of this invention is to provide enteric coated medicaments in which the enteric material is more conveniently, more economically, and more efficiently applied due to its proper tackiness. Another object of this invention is to provide enteric coated medicaments in which each coat of the enteric coating material does not have to be dried before the next coat is applied. A further object of the present invention is to provide enteric coated medicaments which are not brittle. A further object of this invention is the provision of such a medicament in which the enteric material is stable after long periods of storage. A further object of the present invention is to provide enteric coated medicaments in which the enteric coating material has a low disintegration time in the intestine, which time does not increase significantly during storage of the medicament. A still further object of the present invention is to provide medicaments protected by an enteric material which disintegrates faster in the intestine than other enteric coating materials of the same weight. Still other objects of this invention will be apparent to one skilled in the art to which this invention pertains.

The foregoing and additional objects have been accomplished by the provision of novel enteric medicaments protected by a material which is insoluble in gastric media and soluble in intestinal media. The material imparting enteric characteristics comprises a hydrolyzed styrene-maleic anhydride copolymer and a finely divided mineral solid whose crystals are micaceous in form. The copolymer is made up of styrene residues and maleic acid residues which may or may not contain a third type of residue, or the water soluble, non-toxic salts of the copolymer (e.g., the ammonium, alkali metal and alkaline earth metal salts). The finely divided mineral solid is dispersed in the film forming copolymer. It can be natural or artificial, hydrous or anhydrous.

Broadly, the enteric copolymer of the present invention comprises hydrolyzed styrene-maleic anhydride copolymer which is more than fifty percent hydrolyzed. The copolymer can be modified to a minor extent by the presence of some other homopolymerizable ethylenic unit, such as that of acrylonitrile, acrylic acid, methacrylic acid, itaconic acid, vinyl chloride, vinylidene chloride, and the like. As used in the present specification hydrolyzed styrene-maleic anhydride copolymer is meant to include such modifications as well as modifications in the structure and method of preparation which do not alter the essential resinous nature, toxicity and acid properties of the copolymer.

Essentially the copolymers of the present invention can be represented by the following formula:

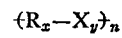

wherein R represents homopolymerizable ethylenic units of which more than seventy percent are styrene units (the other ethylenic units being those of acrylonitrile, acrylic acid, methacrylic acid, itaconic acid, vinyl chlorine, vinylidene chloride, and the like), X represents ethylenic units of maleic acid and maleic anhydride of which more than fifty percent are maleic acid units (preferably more than seventy percent), and $x/y$ equals from one to about four (preferably from one to about 1.2). The average molecular weight of the copolymer ranges from about 20,000 to about 200,000.

It is to be understood that, in its broader aspects, the present invention relates to hydrolyzed styrene-maleic anhydride copolymer which is more than fifty percent hydrolyzed. It includes the material described no matter how it is produced or how it is modified as long as the structure of the copolymer is primarily that of hydrolyzed styrene-maleic anhydride copolymer of the indicated properties and structure.

The other essential component of the enteric coating composition of the present invention is a finely divided mineral solid whose crystals are micaceous in form, which is dispersed throughout the film-forming copolymer. The mineral solid not only contributes to ease of manufacturing but also is essential to produce a product having the desired enteric properties, as will be shown.

The mineral solid must be pharmaceutically acceptable, i.e., physically and chemically suitable for pharmaceutical use. It should be non-toxic and inert to the copolymer, the active ingredient, or any other material present. It must be substantially water insoluble and insoluble in the organic solvent in which the copolymer is soluble, e.g., alcohol, acetone, or mixtures thereof. It must have a suitable crystal structure to produce a smooth enteric film having suitable disintegration properties and to perform the functions of a dusting powder, i.e., a sufficient amount of lubricating property to enable the solid materials being coated to slip past each other during the coating process. Natural and artificial mineral solids whose crystals are micaceous in form, are those exhibiting perfect cleavage and having two of the dimensions large compared with the third dimension. Examples are minerals such as talc, calcite and any of the basic silicates having a large negative birefringence and exceedingly perfect cleavage, due to the molecules within the crystal being flat and lying parallel to one another, giving rise to thin elastic plates; and further such artificial minerals as magnesium stearate and barium sulfate having a large positive birefringence and exhibiting perfect cleavage with resulting thin, elastic plates, due to the rod-shaped molecules lying within the crystal all parallel to a plane, but not to each other. Other suitable mineral solids are fuller's earth, diatomaceous earth (also known as infusorial earth, fossil flour, kieselguhr, and siliceous earth), bentonite (wilkinite), kaolin (e.g. bolus alba, china clay, porcelain clay, white bole, arzetba, and terra alba), calcium stearate, calamine or zinc oxide, and the like. A more complete list of suitable mineral silicates can be found on pages 304, 305 and 306 of Reference Book of Inorganic Chemistry by Wendell M. Latimer and Joel H. Hildebrand, Revised Edition, The Macmillan Company, 1940. Mixtures of the foregoing materials are also suitable. For example, mixtures of calcium stearate with talc and magnesium stearte with talc are well-suited for the present purposes. From among the mixtures, a mixture of about twenty percent by weight of magnesium stearate and about eighty percent by weight of talc is preferred. From among the individual mineral solids, talc is preferred since, in addition to imparting the desired enteric properties to the copolymer, it satisfactorily separates the tablets, prevents "pulling" and yields coated tablets with a smooth, even surface. All of the tablets so coated have satsifactory disintegration times in the range of ten to fifty minutes in artificial pancreatic fluid, pH 6.9. There is a high degree of correlation between the initial pancreatic disintegration time and the mean weight of talc used during the enteric coating process. The initial disintegration time increases with an increase in the amount of talc used. Furthermore, the talc does not significantly change the resistance of the enteric coatings to artificial gastric juice or to water.

The particle size of the mineral solids and adjuvant materials is also important. The particle size should be less than about fifty microns. Thus, particles which will all pass through a 325 mesh screen are suitable.

The preferred specifications for the talc in the present composition are those of talc U.S.P. having a surface means diameter of approximately two microns (100 percent being finer than thirty microns), a specific surface of 10,710 square centimeters per gram, and a specific gravity of 2.76.

It is preferred that the enteric material be applied to medicaments as a coating or made up as a capsule shell to be filled wtih some form of the medicament to be protected, thus providing a novel article of manufacture. This invention also provides novel coating solutions containing the copolymer and a plasticizer dissolved in a polar low-boiling solvent for the copolymer.

One of the most suitable substances used in enteric coating is cellulouse acetate phthalate. Its preparation is described in U.S. Patents 2,093,462 and 2,196,768. Cellulose acetate phthalate is soluble in phosphate buffer solutions at pH 5.8 but not at pH 5.5; in this case "solubility" means twenty milligrams of cellulose acetate phthalate dissolved in 100 milliliters of buffer solution at 98 degrees Fahrenheit. When sodium hydroxide solution is added to cellulose acetate phthalate suspended in water, the polymer gradually goes into solution to form the sodium salt. The final solution of the sodium salt has a pH of 5.4 to 5.6 [C. J. Malm et al., J. Am. Pharm. Assoc. 40, 520 (1951)]. It is believed that cellulose acetate phthalate, when applied as an enteric coating, dissolves in the intestines mainly from the ionization of the free carboxyl group with formation of a water-soluble salt even though the pH of the intestines may be as low as pH 5.5 to pH 7.0. Part of its solubility in the intestinal contents has been ascribed to the action of intestinal enzymes on the ester linkages with the formation of water-soluble hydrolytic products [C. W. Bauer et al., J. Am. Pharm. Assoc. Sci. Ed., 37, 124 (1948)], but further investigation indicates that this is not true.

A successful enteric coating must disintegrate rapidly in the intestinal tract but it should be satisfactorily resistant to strongly acid and stomach conditions. This property is especially important for medicinals which are readily absorbed in the upper gastro-intestinal tract but not in the lower portions thereof. [See L. E. Josselyn et al., Antibiotics and Chemotherapy 3, 63–66 (1953) and Cheng-Chun Lee et al., Antibiotics and Chemotherapy IV, 926–930 (1954).] It has been indicated by several workers in this field that the enteric coating should disintegrate within one hour in the intestine. [See Hawkins et al., J. Am. Pharm. Assoc. Sci. Ed., 42, 424—430 (1953) and Thompson et al., J. Am. Pharm. Assoc. Sci. Ed., 34, 138 (1945).] These authors also indicate that it is desirable for such a coating to resist stomach conditions for at least five hours.

It is desirable that the disintegration time in the intestine be held to an hour or less, and that the disintegration time should remain at this low figure regardless of the time the enteric coated medicament is stored. For example, Maney et al. reported in J. Am. Pharm. Assoc. Sci. Ed., 30, 276–282 (1941), a series of tests on shellac and shellac-combinations which revealed that, over a period of two years, tablets so coated increased their disintegrating time materially. For example, the disintegration time of shellac-coated tablets increases up to two to four hours after storage for one month at 47 degrees centigrade, three months at forty degrees centigrade or at room temperature.

Some enteric coatings have the disadvantage of being brittle which contributes materially to the problem of handling the tablets during the manufacturing process.

Other problems presented by enteric coatings developed prior to the present invention relate to application of the coatings. For example, some coating materials do not have the proper tackiness to prevent "slipping" of the tablets when the conventional pan-coating technique is used during the enteric coating process. Shellac solutions are so tacky that special precautions must be observed to prevent the tablets from sticking together during the coating process. Another disadvantage in applying shellac solutions is that each coat must be dry before the next one is applied. [See Wruble, Am. J. Pharm. 102, 318–28 (1930) and Gakenheimer, U.S. Patent 2,598,530.]

Styrene-maleic anhydride copolymer is a commercially available compound which can be obtained in modified or unmodified form. Rein SC–2 is sold by the Monsanto Chemical Company and is a modified styrene-maleic anhydride copolymer. These copolymers are hydrolyzed to obtain a styrene-maleic acid copolymer which is useful as an enteric material in the present invention. The hydrolysis can be partial or it can be complete and involves a conversion of the acid anhydride linkages to $\alpha$-dicarboxylic acid units. It is preferred that the hydrolysis be substantially complete, i.e., more than about fifty percent complete.

E I. du Pont de Nemours and Company (Grasselli Chemicals Department) sell a product called "G–942" tanning agent, which is a partial sodium salt of a hydrolyzed styrene-maleic anhydride copolymer in a 25 percent water solution. This solution can be used as such; but it is preferred to use the free acid form which can be obtained by precipitation with hydrochloric acid, washing the precipitate with water, and drying the product in an oven at sixty degrees centigrade or in vacuo at room temperature.

Garrett and Guile [J. Am. Chem. Soc., 73, 4533 (1951)] have shown that, in the polymerization of styrene and maleic anhydride, for a 1:1 molar reactant ratio [styrene ($x$) maleic anhydride ($y$)], the molar ratio of monomeric units in the polymer ($x:y$) was 1.124; for a 3:1 molar reactant ratio ($x:y$), the molar ratio of monomeric units in the polymer ($x:y$) was 1.183; for a 1:3 molar reactant ratio ($x:y$), the molar ratio of monomeric units in the polymer ($x:y$) was 1.026. On the basis of potentiometric titrations one of the hydrolyzed products had a $x:y$ ratio of 1.22±0.02:1 and the hydrolyzed Resin SC–2 had a $x:y$ ratio of 1.18±0.03:1. These values indicate that this commerical product was probably prepared from a 3:1 molar reactant ratio ($x:y$). This gives an indication of the relative values of $x$ and $y$ in the general formula presented above.

Using potentiometric titration data the hydrolyzed styrene-maleic anhydride copolymer can be shown to have a $pK_a$ of such a value that the copolymers of the present invention are more soluble at a lower pH than is cellulose acetate phthalate. Between pH 1 and 2.5 (the pH found in a normal stomach) the polymers are only zero to five percent ionized and are thus insoluble at this pH.

According to a preferred embodiment of the present invention a tablet, pill, powder, granule, pilule or other solid dosage form containing the medicinal is coated with enteric material according to the invention. A suitable procedure for this purpose is as follows: the tablets are placed in a suitable coating pan and allowed to roll. A solution of the copolymer in a polar, low-boiling solvent is made, is applied by ladle to the tablets and the tablets are immediately stirred well by hand to distribute the solution. Sufficient solution is applied to cover all of the surfaces, and particularly the edges of the tablets. The tablets are allowed to roll for a few minutes. During this period the tablets begin to dry and become tacky. When the tablets begin to stick together and roll into a ball, the finely divided mineral solid (e.g., talc) is applied by ladle. The tablets are stirred well by hand to distribute the mineral solid over all the surfaces and prevent the tablets from sticking together. The tablets are allowed to roll for a few minutes to give sufficient time for the mineral solid to smooth out. The hot air is then turned on and the solvent allowed to evaporate completely. When the first application is sufficiently dry, the hot air is shut off, and the above process is repeated several times until the coating solution has been used up for that lot. At the termination of the coating process, the tablets are removed from the coating pan, spread out on a metallic screen and dried in a low humidity oven at approximately 100 degrees Fahrenheit for approximately three days until thoroughly dry. Pills, pilules, tablets and other solid dosage forms can be coated in a like manner.

An alternative procedure to pan coating involves use of the spray gun technique to apply the coating solution. In this case the mineral solid can be applied as a fluidized spray, e.g., talc fluidized by air.

Coating solutions can be prepared from a number of different solvents, at least one of which has special advantages. Among the polar, low-boiling solvents useful in the coating solutions are methanol, ethanol, dioxane, acetone, methyl ethyl ketone, combinations thereof, and the like. Aqueous solutions of the copolymer can be prepared from water soluble salts such as ammonium, alkaline earth metal and alkali metal salts of the copolymer. One of the advantages of using a hydrolyzed styrene-maleic anhydride copolymer as an enteric material is that ethanol alone can be used as a solvent rather than the usual mixture of acetone and ethanol. This results in lower fire hazard due to higher flash point of the solvent, slower evaporation of the solvent allowing the polymer dissolved therein to become more evenly distributed over the dosage forms being coated, and greater economy.

Although not absolutely necessary, it is preferred to use a plasticizer with the enteric copolymer. The plasticizer primarily serves the purpose of modifying the strong secondary forces linking the polymer chains, thereby imparting to the polymer a greater freedom of motion resulting in elasticity and flexibility. It also increases the resistance of the enteric coating to acid and water but does not change the pancreatic disintegration time. The plasticizer is preferably dissolved in the solvent along with the enteric copolymer before being applied to the medicinal. Suitable plasticizers include most phthalic acid esters of straight chain and branched chain aliphatic alcohols, such as dibutyl phthalate, diethyl phthalate, dimethyl cellosolve phthalate, dioctyl phthalate and the like. Dibutyl phthalate and diethyl phthalate are preferred. Other plasticizers which may be used are polyethylene glycol 200, polyethylene glycol 400, and glyceryl monooleate. From about zero to about thirty percent of the weight of the copolymer used in the coating solution can consist of plasticizer; about ten to about twenty percent is preferred.

A representative group of the more preferred coating solutions is as follows:

|  | Gms. |
|---|---|
| (1) Hydrolyzed styrene-maleic anhydride copolymer [1] | 156.25 |
| Dibutyl phthalate | 18.75 |
| Denatured ethanol, sufficient to make 1000.0 mls. | |
| (2) Hydrolyzed styrene-maleic anhydride copolymer [1] | 150 |
| Diethyl phthalate | 30 |
| Denatured ethanol, sufficient to make 1000.0 mls. | |

[1] Having more than eighty percent of the anhydride units hydrolyzed to $\alpha$-dicarboxylic acid units.

(3) Hydrolyzed styrene-maleic anhydride copolymer [1] _____ 156.25
Dibutyl phthalate_____ 18.75
Denatured ethanol, acetone—equal parts by volume sufficient to make 1000.0 mls.

(4) Hydrolyzed styrene-maleic anhydride copolymer [1] _____ 150
Dibutyl phthalate_____ 18
Denatured ethanol, acetone—equal parts by volume sufficient to make 1000.0 mls.

(5) Hydrolyzed styrene-maleic anhydride copolymer [1] _____ 46.875
Cellulose acetate phthalate_____ 46.875
Dibutyl phthalate_____ 18.75
Denatured ethanol, acetone—equal parts by volume sufficient to make 1000.0 mls.

[1] Having more than eighty percent of the anhydride units hydrolyzed to a-dicarboxylic acid units.

One fluid ounce of liquid petrolatum U.S.P. per quart of solution and/or an amount of talc U.S.P. equal to the weight of the copolymer in the solution can be added to any of these solutions. The addition of these ingredients sometimes increases the ease of application of the coating solutions to the tablets. When the talc and/or liquid petrolatum is added the resulting mixture is a suspension.

The amount of coating ingredients used varies with the particular type of product. In the case of pilules, the amount of hydrolyzed styrene-maleic anhydride copolymer used per pilule is from about fifteen to 25 percent of the final weight of the coating per pilule, with about twenty percent preferred. The remainder of the coating consists of a plasticizer and mineral solid. The weight of mineral solid used is from 2.5 to eight times the weight of the copolymer used with about 3.75 times preferred. Dibutyl phthalate (about twelve percent based on the weight of the copolymer used) and a mixture of about twenty percent by weight of magnesium stearate and about eighty percent by weight of talc are preferred for use in the pilule coatings. In the case of tablets or pills, the amount of hydrolyzed styrene-maleic anhydride copolymer used per tablet is from about fifteen to fifty percent of the final weight of coating per tablet, with about thirty percent preferred. The remainder of the coating consists of plasticizer and a mineral solid. The weight of the mineral solid used is from about one to seven times the weight of the copolymer, with about three times preferred. Dibutyl phthalate (about twelve percent by weight based on the weight of the copolymer used) and talc are preferred for use in the tablet or pill coatings.

Among the medicaments which may be advantageously enteric coated are the following: sodium salicylate, ammonium chloride, theophylline with sodium acetate, thyroid, erythromycin, sodium chloride, potassium chloride, magnesium sulfate, potassium nitrate, ferrous sulfate, methenamine-sodium biphosphate, mandelic acid-ammonium chloride, emetine and bismuth compounds, aminophyllin, theobromine sodium acetate, pancreatin, bile salts, extract of bile, digitalis, gentian violet, some anthelmintics, trypsin, metallic sulfides, salts of mercury, sodium ricinoleate, delayed-action type medicaments such as 10[2-(1-pyrrolidyl)ethyl]-phenothiazine hydrochloride, pepsin, ammonium salicylate, potassium p-aminobenzoate, bacterial antigens and adrenocortical steroids.

Some of the dosage forms indicated are preferably subcoated prior to enteric coating. The subcoating is an innocuous material which rounds and smooths the edges of dosage forms, such as tablets, and allows a more uniform enteric coating to be applied thereto. It has been found that carboxymethylcellulose in syrup provides such a subcoating. (See Spradling, U.S. Patents 2,693,436 and 2,693,437.)

The thickness of the enteric coating applied should preferably range between about 0.002 and 0.015 inch.

CRITICALITY OF THE MINERAL SOLID

The following experiment was designed to determine the criticality of the finely powdered mineral solid to the enteric composition of the present invention.

Placebo tablets, ⅜" oval, were prepared from five grains of dicalcium phosphate per tablet granulated with starch paste, syrup and water and the granules compressed after lubrication with 0.15 grain of starch and 0.03 grain of calcium stearate per tablet.

The compressed tablets were subcoated with a solution of sodium carboxymethylcellulose and sucrose in water, using talc as the mineral solid, then a mixture of precipitated calcium carbonate, talc and acacia powder as mineral solids. The tablets were smoothed with a syrup of sucrose and water using a mixture of precipitated calcium carbonate, talc and acacia powder as mineral solids. The tablets were then dried in an oven at 105° F. A total of 19,400 tablets were subcoated and smoothed in this manner, then the dried tablets were divided into four equal parts by weight, there being approximately 4850 tablets in each part.

A stock enteric coating solution was prepared as follows:

|  | Gm. |
|---|---|
| Styrene-maleic acid copolymer (15% by wt. in volume) | 600 |
| Di-n-butyl phthalate (1.8% by wt. in volume) | 72 |
| S–D Alcohol 3A, anhydrous, q.s. to make 4000 ml. | |

This solution was divided into four equal parts, each part representing 150 gm. of styrene-maleic acid copolymer.

*Coating tablet sub-lot "A."*—1000 ml. of the above stock solution was applied to approximately 4850 subcoated tablets in 35 applications using talc as mineral solid (a total of 26 oz. of talc was used).

*Coating tablet sub-lot "B."*—1000 ml. of the above stock solution was applied to approximately 4850 subcoated tablets in 68 applications without talc (or other mineral solid) being used.

*Coating tablet sub-lot "C."*—1000 ml. of the above stock coating solution was diluted with 2000 ml. of S.D. Alcohol 3A anhydrous making a total of 3000 ml. of solution containing 5% w./v. styrene-maleic acid copolymer. This diluted solution was applied to approximately 4850 subcoated tablets in 80 applications using talc (a total of 28 oz. of talc was applied).

*Coating tablet sub-lot "D."*—1000 ml. of the above stock coating solution was diluted with 2000 ml. of S.D. Alcohol 3A anhydrous making a total of 3000 ml. of solution containing 5% w./v. styrene-maleic acid copolymer. This diluted solution was applied to approximately 4850 subcoated tablets in 128 applications without talc (or other mineral solid) being used.

REMARKS (1) When the tablets were enteric coated without use of talc the tablets tended to "pull" and agglomerate as the solution lost solvent by evaporation in the coating pan.

(2) The final tablets coated without use of talc had rough surfaces and the enteric coatings were cracked. The final tablets coated with use of talc had smooth coatings.

(3) It required much more labor and time to apply the same volume of solution when talc was not used than when talc was used.

Table 1.—Disintegration times of tablets in fluids at 37.5° C.

| Lot of tablets | Basket number | Tube number | Time in minutes ||| Ratio: D.T. at pH 1.2 / D.T. at pH 6.9 |
|---|---|---|---|---|---|---|
| | | | Artificial gastric juice, pH 1.2 || Artificial pancreatic fluid, pH 6.9 | |
| | | | Coating broken (C.B.)[1] | Disintegration time of whole tablet (D.T.)[2] | Disintegration time of whole tablet (D.T.)[2] | |
| Compressed tablets | 1 | 1 | ---------- | 0.4 | 0.5 | $\frac{0.4}{0.5} = 0.8$ |
| | | 2 | ---------- | 0.4 | 0.5 | |
| | | 3 | ---------- | 0.4 | 0.5 | |
| | | 4 | ---------- | 0.4 | 0.5 | |
| | | 5 | ---------- | 0.4 | 0.5 | |
| | | 6 | ---------- | 0.4 | 0.5 | |
| | | | | [4] 0.4 | [4] 0.5 | |
| Subcoated tablets | 2 | 7 | ---------- | 2.75 | 4.0 | $\frac{2.5}{4.5} = 0.6$ |
| | | 8 | ---------- | 2.00 | 5.0 | |
| | | 9 | ---------- | 3.00 | 5.0 | |
| | | 10 | ---------- | 3.00 | 4.5 | |
| | | 11 | ---------- | 2.25 | 4.5 | |
| | | 12 | ---------- | 2.00 | 4.0 | |
| | | | | [4] 2.5 | [4] 4.5 | |
| Subcoated tablets enteric coated with 5 percent solution of SY-MA[3] without talc | 1 | 1 | ---------- | 18.0 | 10.5 | $\frac{12.8}{9.25} = 1.4$ |
| | | 2 | ---------- | 19.0 | 11.5 | |
| | | 3 | ---------- | 12.0 | 9.0 | |
| | | 4 | ---------- | 12.0 | 8.0 | |
| | | 5 | ---------- | 8.0 | 7.5 | |
| | | 6 | ---------- | 8.0 | 9.0 | |
| | | | | [4] 12.8 | [4] 9.25 | |
| Subcoated tablets enteric coated with 15 percent solution of SY-MA[3] without talc | 2 | 7 | ---------- | 10.5 | 9.5 | $\frac{11.6}{8.75} = 1.3$ |
| | | 8 | ---------- | 9.0 | 8.0 | |
| | | 9 | ---------- | 14.5 | 10.0 | |
| | | 10 | ---------- | 13.5 | 9.0 | |
| | | 11 | ---------- | 9.5 | 9.0 | |
| | | 12 | ---------- | 12.5 | 7.0 | |
| | | | | [4] 11.6 | [4] 8.75 | |
| Subcoated tablets enteric coated with 5 percent solution of SY-MA[3] and talc | 1 | 1 | 240 | 420 | 14.0 | $\frac{238}{17.4} = 13.7$ |
| | | 2 | 210 | 230 | 17.0 | |
| | | 3 | 180 | 240 | 21.5 | |
| | | 4 | 160 | 180 | 17.5 | |
| | | 5 | 180 | 220 | 16.5 | |
| | | 6 | 110 | 135 | 15.0 | |
| | | | [4] 180 | [4] 238 | [4] 17.4 | |
| Subcoated tablets enteric coated with 15 percent solution of SY-MA[3] and talc | 2 | 7 | 205 | 230 | 18.5 | $\frac{251}{17.7} = 14.2$ |
| | | 8 | 240 | 300 | 16.5 | |
| | | 9 | 195 | 225 | 18.5 | |
| | | 10 | 180 | 215 | 17.75 | |
| | | 11 | 180 | 230 | 16.5 | |
| | | 12 | 225 | 305 | 18.5 | |
| | | | [4] 204 | [4] 251 | [4] 17.7 | |
| Subcoated tablets enteric coated with 5 percent solution of SY-MA[3] and talc (repeat run) | 1 | 1 | 310 | >360 | 14.0 | $>\frac{223}{17.4} > 12.8$ |
| | | 2 | 165 | 170 | 17.0 | |
| | | 3 | 120 | 135 | 21.5 | |
| | | 4 | >360 | >360 | 17.5 | |
| | | 5 | 135 | 140 | 16.5 | |
| | | 6 | 120 | 170 | 15.0 | |
| | | | [4]>202 | [4]>223 | [4] 17.4 | |
| Subcoated tablets enteric coated with 15 percent solution of SY-MA[3] and talc (repeat run) | 2 | 7 | 220 | 270 | 18.5 | $>\frac{300}{17.7} > 16.9$ |
| | | 8 | 360 | >360 | 16.5 | |
| | | 9 | 285 | >360 | 18.5 | |
| | | 10 | 210 | 270 | 17.75 | |
| | | 11 | 220 | 270 | 16.5 | |
| | | 12 | 235 | 270 | 18.5 | |
| | | | [4] 255 | [4]>300 | [4] 17.7 | |

[1] C.B.—Enteric coating broken.
[2] D.T.—Tablet completely disintegrated at 99 to 100 percent through screen of U.S.P. disintegration apparatus.
[3] SY-MA—Hydrolyzed styrene maleic anhydride copolymer.
[4] Average.

Table II gives data on compressed and subcoated tablets. Since it is desirable that the tablet disintegrate as quickly as possible once the enteric coating material has been dissolved, it will be seen that the combination of a sodium carboxymethylcellulose syrup, a talc-calcium carbonate mineral solid, and talc gives the best results, although all of the subcoatings indicated can be used.

Table II.—Data on compressed and subcoated tablets

| Compressed tablet | | | Subcoated tablet | | | | | |
|---|---|---|---|---|---|---|---|---|
| Type | Mean weight (gm.) | Punch size | Type of subcoating | Mean thickness (inches) | | Mean volume (cu. mm.) | Mean weight (gm.) | Mean disintegration time in artificial pancreatic fluid, pH 6.9 (minutes) |
| | | | | Edge of tablet | Side of tablet | | | |
| Barium sulfate, 3 grs | 0.437 | ⅜" oval | Gelatin syrup, talc-CaCO₃ dusting powder. | 0.418 | 0.229 | 305 | 0.543 | 8.8 |
| Do | 0.426 | do | NaCMC* syrup, talc-CaCO₃ dusting powder. | 0.407 | 0.207 | 301 | 0.542 | 4.8 |
| Do | 0.421 | do | do | 0.415 | 0.218 | | 0.606 | 5.8 |
| Ammonium salicylate, 0.3 gm<br>Potassium p-aminobenzoate 0.3 gm<br>Calcium pantothenate 5.5 mg | 0.663 | ⅝" wide<br>¾" long<br>Elliptical | NaCMC syrup, talc, terra alba-acacia. | | | | 0.804 | |
| Ammonium chloride, 7½ grs | | ⁷⁄₁₆" oval | Gelatin syrup, sugar syrup, talc-CaCO₃ dusting powder. | 0.482 | 0.246 | | 0.766 | |
| Sodium salicylate, 5 grs | 0.334 | ⅜" oval | Gelatin syrup, talc-CaCO₃ dusting powder. | | 0.216 | | 0.492 | |

*Sodium carboxymethylcellulose.

It is possible to use the copolymer in combination with other known enteric coating materials. Such enteric coating materials include cellulose acetate phthalate, starch acetate phthalate, amylose acetate phthalate, salts thereof, other derivatives of cellulose and starch possessing enteric properties, and the like.

Tablets enteric coated with 95 percent hydrolyzed styrene-maleic anhydride copolymer, starch acetate phthalate or cellulose acetate phthalate all stayed intact in the stomach of the dog for periods up to and greater than 7.5 hours. The data presented in Table III indicate that they all disintegrate in the intestine of the dog. Hence these coated tablets were truly "enteric"—that is they resisted the action of the stomach contents but disintegrated in the intestines.

intestines of dogs) at a faster rate than the tablets enteric coated with either cellulose acetate phthalate or starch acetate phthalate.

These data prove that the in vitro disintegration times determined in artificial fluids have a very close relationship to the disintegration times of the same enteric coated tablets in the intestines of the dog.

Table IIIa gives results of a roentgenographic and fluoroscopic study in human beings showing that (1) there is a very close relationship between the resistance time of tablets coated with the composition of the present invention in the stomach of the human being and the resistance times of the same lots of tablets in artificial gastric juice, pH 1.2, and (2) there is a very close relationship between the disintegration time of the tablets coated with the composition of the present invention in Table III.—Summary of in vitro and in vivo disintegration times of tablets enteric coated with different enteric substances

| Enteric polymer used on tablets | Intestinal disintegration time (minutes) | | 99 percent confidence interval about the mean weight of enteric coating per tablet (mg.) | 99 percent confidence interval about the mean thickness of enteric coating | | Mean weight of enteric polymer applied per tablet (mg.) | Mean weight of talc applied per tablet (mg.) |
|---|---|---|---|---|---|---|---|
| | In Vitro ᵃ $\overline{Ti} \pm S\overline{Ti}$ | In Vivo ᵇ $\overline{T} \pm S\overline{T}$ | | Edge of tablet (inches×10⁻³) | Side of tablet (inches×10⁻³) | | |
| Hydrolyzed styrene-maleic anhydride copolymer | 15.1±0.30 | 32.2±2.61 | 81±10 | 8.8±2.3 | 7.6±1.4 | 25 | 91 |
| Cellulose acetate phthalate | 43.8±0.59 | 54.0±3.68 | 73± 8.7 | 4.6±0.7 | 6.3±1.2 | 12 | 57.4 |
| Starch acetate phthalate | 58.2±1.51 | 62.5±3.89 | 82±16 | 6.4±1.0 | 6.4±1.3 | 21 | 79 |

ᵃ $\overline{Ti} \pm S\overline{Ti}$ = mean disintegration time±the standard error of the mean distintegration time in pH 6.9 artificial pancreatic fluid at 37°±2° C. (in minutes), using apparatus described in U.S.P. XIV, page 700.

ᵇ $\overline{T} \pm S\overline{T}$ = mean disintegration time±the standard error of the mean disintegration time in the intestinal tract of the dog (in minutes). Each value is the mean of six determinations.

The data presented in Table III also indicate that the barium sulfate tablets enteric coated with hydrolyzed styrene-maleic anhydride copolymer had a greater thickness and a greater weight of enteric coating and a greater weight of both talc and enteric polymer had been applied to the tablets than those coated with cellulose acetate phthalate. Yet the tablets coated with hydrolyzed styrene-maleic anhydride copolymer disintegrated in vitro (in artificial pancreatic fluid, pH 6.9) and in vivo (in the the upper intestinal tract of the human being and the disintegration times of the same lots of tablets in artificial pancreatic fluid, pH 6.9.

Since it is extremely difficult to prepare batches of tablets having different enteric coating substances and yet having exactly the same weight, volume and thickness of coating, experiments were carried out with different batches. The data resulting from such experiments are shown in Table IV.

Table IIIa.—Summary of clinical and in vitro tests of barium sulfate tablets coated with hydrolyzed SY-MA copolymer and talc

| Tablets | In vivo results in man—Tablets which remained in the stomach during the observation period | | | | In vitro tests — Artificial gastric juice, pH 1.2, at 37±2° C. U.S.P. disintegration apparatus coating cracked open end-point | | Comparison — Average in vivo time / average in vitro time |
|---|---|---|---|---|---|---|---|
| | Subject | Number tabs. | Time film showed tablets intact | Time film showed attack occurred | Average, mins. | Range, hrs. | |
| Lot 1 stored 5 mo. at room temperature | a | 1 | 3 hrs. 59 mins | 5 hrs. 27 mins | 270 | 3¾ to 6 | $\frac{307}{270} = \frac{1.1}{1}$ |
| | b | 2 | 4 hrs. 0 mins | 5 hrs. 29 mins | | | |
| | c | 1 | 3 hrs. 1 min | 4 hrs. 1 min | | | |
| | c | 1 | 5 hrs. 1 min | 5 hrs. 11 mins | | | |
| | | | | ¹5 hrs. 7 mins | | | |
| Lot 2 stored 5 mo. at room temperature | a | 1 | 2 hrs. 1 min | 3 hrs. 0 mins | 164 | 2¼ to 3¹/₈ | $\frac{203}{164} = \frac{1.2}{1}$ |
| | b | 2 | 2 hrs. 0 mins | 2 hrs. 58 mins | | | |
| | b | 2 | 3 hrs. 30 mins | 4 hrs. 0 mins | | | |
| | | | | ¹3 hrs. 23 mins | | | |
| Lot 3 stored 12 mo. at 40° C. and then 4 mo. at room temperature | a | 2 | 5 hrs. 0 mins | | Unaffected after 7½ hours. After further 37½ hours at room temperature with no agitation, coatings had only small breaks and most of contents intact. | | |
| | b | 4 | 5 hrs. 0 mins | | | | |
| | | ² 16 | | | | | |

| Tablets | In vivo results in man—Tablets which entered the small intestine | | | In vitro tests — Artificial pancreatic fluid, pH 6.9, at 37± 2° C. U.S.P. disintegration apparatus end-point: 99–100% disintegrated | |
|---|---|---|---|---|---|
| | Subject | Number tabs. | Fate of tablets | Average, mins. | Range, mins. |
| Lot 1 stored 5 mo. at room temperature. | a | 1 | First film taken 2 hrs. 3 mins. after administration showed tablets intact in lower jejunum or upper ileum. Second film taken 27 mins. later, showed no trace of tablet and it was assumed completely disintegrated. Subsequent films confirmed this. | 30 | 27 to 33.5. |
| Do | c | 4 | First film taken 2 hrs. 3 mins. after administration showed no trace of tablets. All 4 tablets completely disintegrated. | 16 | 14 to 17.5. |
| Do | a | 1 | First film taken 2 hrs. 1 min. after administration showed no trace of tablet. Assumed completely disintegrated. Subsequent films confirmed this. | 16 | 14 to 17.5. |
| Lot 3 stored 12 mo. at 40° C. and then 4 mo. at room temperature. | c | 6 | First film taken ½ hour after administration of last 2 of 6 tablets to starved subject showed 1 tablet in first part of duodenum and 5 tablets in about middle of jejunum—all intact. 24 minutes later the tablet which was in the duodenum had moved to the upper jejunum. 1 of the 6 tablets completely disintegrated in the jejunum 35 minutes after the first film. The other 5 tablets were completely disintegrated 50 minutes after the first film. | 31 | 23 to 33. |
| | | ² 12 | | | |

¹ Average.   ² Total.

Table IV

| Polymer | Tablet batch | Number of aliquots into which solution divided | Mean weight of talc applied per tablet (mg.) | Mean weight of polymer applied in solution per tablet (mg.) | 99 percent confidence interval about the mean volume of enteric coating (cu. mm.) | 99 percent confidence interval about the mean weight of enteric coating (mg.) | 99 percent confidence interval about the mean thickness of enteric coating | | The mean disintegration time in artificial pancreatic fluid, pH 6.9 | |
|---|---|---|---|---|---|---|---|---|---|---|
| | | | | | | | Edge of tablet (inches ×10⁻³) | side of tablet (inches ×10⁻³) | Whole tablet (minutes) | Enteric coating (minutes) |
| Hydrolyzed styrene-maleic anhydride copolymer | 95% hydrolyzed | 37 | 91 | 25 | 40.0± 4.8 | 81 ±10 | 8.8±2.3 | 7.6±1.4 | 15.1±0.96 | 10.3 |
| | 90% hydrolyzed | 33 | 95 | 15 | 41.7± 5.4 | 91 ±14 | 6.6±1.5 | 7.2±4.6 | 17.3±1.7 | 12.5 |
| | 90% hydrolyzed | 30 | 125 | 25 | 48.4± 8.8 | 102 ±11 | 8.8±1.1 | 8.9±1.1 | 33.8±2.4 | 29.0 |
| | 90% hydrolyzed | 24 | 130 | 25 | 58.4±12.6 | 138 ±10 | 10.1±1.4 | 10.9±1.0 | 41.0±1.1 | 36.2 |
| | 90% hydrolyzed | 22 | 129 | 25 | 65.0± 8.8 | 138 ± 9 | 10.1±1.4 | 11.2±1.1 | 41.3±2.2 | 36.5 |
| | 90% hydrolyzed | 25 | 147 | 25 | 67.5± 7.5 | 150 ±10 | 10.8±1.1 | 11.5±1.0 | 46.8±0.85 | 42.0 |
| | 90% hydrolyzed | 29 | 136 | 25 | 66.7±10.6 | 137 ± 7 | 10.0±1.0 | 10.1±1.0 | 49.2±2.8 | 44.4 |
| Starch acetate phthalate | 1 | 24 | 47.5 | 12 | | 52 ±15 | 3.8±1.6 | 3.7±1.0 | 23.8±2.2 | 18.0 |
| | 2 | 28 | 54 | 15 | | 61 ±12 | 4.2±0.6 | 5.2±1.0 | 30.3±2.1 | 24.5 |
| | 3 | 32 | 70 | 18 | | 72 ±14 | 5.7±0.7 | 5.9±1.1 | 36.3±3.6 | 30.5 |
| | 4 | 37 | 79 | 21 | | 82 ±16 | 6.4±1.0 | 6.4±1.3 | 44.1±5.1 | 38.3 |
| Cellulose acetate phthalate | 1 | 19 | 49 | 13.4 | | 45 ± 6 | 3.7±0.5 | 3.3±1.4 | 14.8±1.4 | 12.8 |
| | 2 | 24 | 57.4 | 12 | 34.2± 6.2 | 73 ± 8.7 | 4.6±0.7 | 6.3±1.2 | 43.8±0.59 | 35.0 |
| | 3 | 32 | 88.7 | 15 | | 90.8± 8.8 | 6.5±1.4 | 7.5±3.0 | 60.0 | 51.2 |

Table IV lists data for seven batches of tablets enteric coated with hydrolyzed styrene-maleic anhydride copolymer which is more than ninety percent hydrolyzed, four batches enteric coated with starch acetate phthalate and three batches enteric coated with cellulose acetate phthalate. The last column of Table IV lists the mean disintegration time of the enteric coating of each batch of tablets in artificial pancreatic fluid. For each batch this value was found by subtracting the disintegration time of the subcoated tablet for that batch from the disintegration time of the whole enteric coated tablet—both mean disintegration times being determined in the same fluid under the same conditions.

When the mean disintegration times of the enteric coatings are plotted against the mean weights of the enteric coatings, straight lines are obtained. The equation of the lines calculated by the method of "least squares" are:

| Polymer | Equation of line |
| --- | --- |
| Hydrolyzed styrene-maleic anhydride copolymer | $\hat{Tc}=0.47\ \overline{Wc}-26.1$ min. |
| Starch acetate phthalate | $\hat{Tc}=0.66\ \overline{Wc}-16.3$ min. |
| Cellulose acetate phthalate | $\hat{Tc}=0.83\ \overline{Wc}-25.1$ min. | wherein $\hat{Tc}$=the estimated disintegration time of the enteric coating in artificial pancreatic fluid, pH 6.9 (in minutes), and $\overline{Wc}$=the mean weight of the enteric coating (in milligrams) per tablet.

Such linear relationships have not been disclosed in the literature. It can be readily seen that the slopes of the lines differ one from another. The "ideal" enteric coating would be one which had an equation such that the slope was equal to zero—that is the disintegration time of the enteric coating would be independent of the thickness of the coating. It can be readily seen that hydrolyzed styrene-maleic anhydride copolymer yields enteric coatings such that the slope of the line is 0.47 which is much closer to the "ideal" enteric coating than cellulose acetate phthalate which yields enteric coatings such that the slope of the line is 0.83. In other words, the disintegration time of enteric coatings prepared from hydrolyzed styrene-maleic anhydride copolymer are much less sensitive to variations in the weight of the coatings than enteric coatings prepared from cellulose acetate phthalate.

Table V lists stability data on some of the batches of enteric coated tablets. An inspection of this table indicates that the disintegration times of the enteric coated medicaments of this invention in artificial pancreatic fluid, pH 6.9, either do not increase or increase only slightly after storage at room temperature or at elevated temperatures (forty degrees centigrade and 47 degrees centigrade).

The following preparations and examples are illustrative of the composition, article and process of the present invention but are not to be construed as limiting.

PREPARATION 1
*Hydrolysis of styrene-maleic anhydride copolymer*

Materials:
  Styrene-maleic anhydride copolymer (Koppers
    Company, Inc.) _____ kg__    1
  Deionized water (6.454 gallons) _____ l__   25
  Mixture of 1 volume of concentrated hydrochloric acid and 3 volumes of water _____ ml__  165

(1) In an open steam-jacketed kettle with vertical walls, 25 liters of deionized water is heated to sixty degrees centigrade, the steam is turned off and hot water at 58 degrees to sixty degrees centigrade is run through the jacket continuously to maintain the temperature during the entire hydrolysis at about sixty degrees centigrade.

(2) The heated water is stirred vigorously, and one kilogram of the powdered copolymer is dusted onto the surface of the water over a fifteen minute period.

(3) When all of the copolymer is wetted with water the kettle is covered loosely and with continuous agitation the hydrolysis is allowed to run for 48 hours at approximately sixty degrees centigrade.

(4) At the end of the 48 hour period, most of the hydrolyzed copolymer will be in colloidal solution and part will be in the form of pasty masses. About 165 milliliters of a solution containing one volume of concentrated hydrochloric acid and three volumes of deionized water is added dropwise in order to coagulate the colloidal particles and precipitate the copolymer. The pH should be reduced to about 1 for this operation.

(5) The suspension of paste-like, fibrous-copolymer is transferred to a centrifuge, and the acidic supernatant liquid is drained off rapidly.

(6) The copolymer in the centrifuge is washed by use of a fine spray from a hose carrying deionized water until the acidity of the effluent water from the centrifuge is between pH 3 and 4.

(7) The washed copolymer is scraped from the centrifuge bag and the fibrous mass is cut into suitable strips for drying. The strips of copolymer are spread in thin layers on stainless steel trays. The wet centrifuged product will weigh about 2200 grams and contain about fifty percent moisture.

(8) The hydrolyzed styrene-maleic anhydride copolymer is dried in any of the following ways:

(a) By freeze drying at a shelf temperature not above 26 degrees centigrade (eighty degrees Fahrenheit).

(b) In vacuo at room temperature (26 degrees centigrade).

(c) In an air-circulating oven at a temperature not to exceed about sixty degrees centigrade.

When dried at more elevated temperatures, partial de-

*Table V.—Stability data on some enteric coated tablets*

[Mean disintegration times in minutes of enteric coated tablets in artificial pancreatic fluid, pH 6.9, after tablets had withstood two hours in artificial gastric juice, pH 1.2.¹]

| Enteric coating | Initial | 3 months, R.T. | 6 months, R.T. | 3 months, 40° C. | 1 month, 47° C. | 3 months, 47° C. |
| --- | --- | --- | --- | --- | --- | --- |
| 95% hydrolyzed styrene-maleic anhydride copolymer+talc | ² 15.1±0.96 | 16.5±1.7 | 16.8±0.84 | 18.4±0.95 | 16.4±1.5 | 19.5±1.2 |
| Mixture of equal parts of 90% hydrolyzed styrene-maleic anhydride copolymer and cellulose acetate phthalate+talc | 17.3±1.7 | 20.5±2.1 | | 22.8±2.1 | 20.3±2.3 | 22.0±3.6 |

¹ The disintegration apparatus described in the U.S.P. XIV, page 700 was used. The temperature of the fluids was 37°±2° C.

² Figures refer to the value of $\overline{Ti}\pm S_{\overline{Ti}}\cdot t\ (.01, 11)$ where $\overline{Ti}=\frac{\Sigma(Ti)}{N}$, $S_{\overline{Ti}}=\sqrt{\frac{\Sigma Ti^2-\frac{(\Sigma Ti)^2}{N}}{N(N-1)}}$, $t\ (.01, 11)=3.106$ and $N=12$.

The $Ti$ values used were the individual disintegration times (in minutes) of 12 tablets in each lot. The end-point was taken when substantially no residue remained on the screen of the disintegration apparatus.

The mean volumes, mean thicknesses and mean weights of subcoated tablets used to prepare the enteric coated tablets shown in Tables IV and V were approximately the same.

hydration of the $\alpha,\beta$-dicarboxylic acid with partial reversion to the anhydride copolymer will probably occur, e.g., this has been shown to occur at sixty degrees centigrade in vacuo.

17

The hydrolysis reaction can be represented as follows:

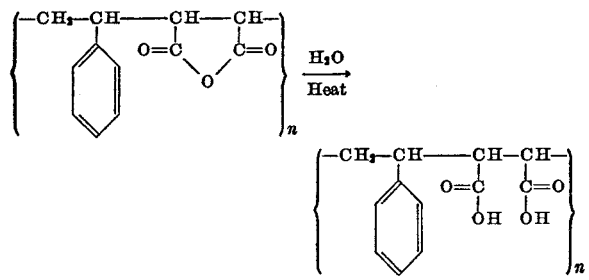

Theoretical yield is approximately 1089 grams.

Practical yields obtained have been 87 and 98 percent of the theoretical.

Table VI gives further data on various preparations of the copolymers of the present invention. By varying the degree of agitation, batch size, temperature of the water and heating time various degrees of hydrolysis can be obtained. Hydrolysis can also be carried out by use of alkali as indicated in the table.

18 tablets are allowed to roll to give sufficient time for the mineral solid to smooth out. The hot air is then turned on to allow most of the remainder of the solvent to evaporate. The hot air is turned off, and a second application of coating solution is made. A total of 27 applications of coating solution is made, i.e., until the total volume of 700 milliliters has been used. At the termination of the coating process the tablets are removed from the pan, spread out on metallic screening and dried in a low humidity oven at approximately 105 degrees Fahrenheit for approximately three days or until the coating is dry and hard.

During the coating process a total of 453 grams of talc is used in the coating.

EXAMPLE 2

*Enteric coated ammonium chloride tablets, seven and one-half grains*

An amount of 700 milliliters of the solution described in Example 1 but containing Preparation F is applied to 4963 subcoated ammonium chloride tablets, seven and

*Table VI.—Hydrolysis of styrene-maleic anhydride copolymer (SY–M) and Resin SC–2*

| Preparation | Hydrolysis conditions | Drying conditions | Weight of starting material-weight of product (gms.) | Percent water | Percent anhydride-percent dicarboxylic acid |
|---|---|---|---|---|---|
| A | 4% suspension in water heated for 2 days at 60°±5° C. with vigorous stirring. | Freeze-dried with shelf temperature not above 26° C. (60° F.). | 250 (SY-M)-267 | | <5%->95% |
| B | do | do | 1,000 (SY-M)-948 | 4.07 | ≅10%-≅90% |
| C | do | In vacuo at 20° C | 3,000 (SY-M)-3,300 | 10.6 | ≅20%-≅80% |
| | | Further 7 days at 38.3° C. 10% R.E. | | 7.36 | ≅20%-≅80% |
| | | Further 3 days at 60° C. air-circulating oven. | | 4.26 | ≅20%-≅80% |
| D | do | 60° C. in air-circulating oven. | 4,536 (SY-M)-4,560 | 1.65 | ≅30%-≅70% |
| E | 1 kg. resin SC-2 added to 10 L of 2% aqueous sodium hydroxide. After 1½ hrs. stirring pH=7.00. Product precipitated with dilute hydrochloric acid. | Low-humidity oven at 60° C. for 41 hours. | 1,000 (resin SC-2)-875 | | <5%->95% |
| F | 2 kg. resin SC-2 heated with stirring in 2.5 gallons water at 100° C. for 5.25 hours. | 6 days at 101° F., 10% R.E. | 2,000 (resin SC-2)-1,640 | | <50%->50% |
| G | 200 gm. "Stymer S" (Monsanto: partial sodium salt of resin SC-2) dissolved in 2 l. water at 80° C. with stirring. Dilute hydrochloric acid added dropwise with stirring to precipitate the hydrolyzed resin SC-2. Latter washed by decantation and dried. | 69 hours at 60° C | 200 (stymer S)-117 | | <50%->50% |
| H | 1,011 gm. SY-M in 5.5 gallons of 2.5% sodium hydroxide was heated at 60-70° C. for 5 hours. Dilute hydrochloric acid was then added dropwise with stirring until the pH had dropped to about pH 3. The precipitated copolymer was recovered by vacuum filtration. | 120 hours at 25° C. in vacuo. | 1,011 (SY-M)-1,100 | 8.22 | 0%-100% |

EXAMPLE 1

*Enteric coated barium sulfate tablets*

75 grams of hydrolyzed resin SC-2 (Preparation E) is dissolved in 600 milliliters of equal parts of acetone and denatured ethanol by means of a mechanical stirrer. Fifteen grams of dibutyl phthalate is dissolved in fifty milliliters of the same solvent mixture, and the solution is added with stirring to the resin solution. The solution is made up to a total volume of 700 milliliters with the same solvent mixture, and the whole is stirred until homogeneous.

5000 subcoated barium sulfate tablets are placed in a twelve inch coating pan, and the pan is rotated so that the tablets begin to roll. An application of approximately 26 milliliters of the above coating solution is poured on the tablets, and the tablets are immediately stirred well by hand to distribute the solution. The amount of solution added is sufficient to cover all the surfaces of the tablets and particularly the edges. The tablets are allowed to roll for a short time. During this time the solvent evaporates slowly, and the tablets begin to dry and become tacky. When the tablets begin to stick together and roll into a ball, the powdered mineral solid (tac U.S.P.) is applied. The tablets are stirred well by hand to distribute the mineral solid over the surfaces of the tablets and to prevent the tablets from sticking together. The one-half grams in size. A total of 27 applications of approximately 26 milliliters of coating solution per application is made in the same manner as described in Example 1 using talc as dusting powder. A total of 284 grams of talc is used in the coating.

EXAMPLE 3

*Enteric coated barium sulfate tablets*

75 grams of the copolymer (Preparation A) and fifteen grams of diethyl phthalate is dissolved with stirring in sufficient denatured ethanol to make 500 milliliters of coating solution.

This solution is applied to 5000 subcoated barium sulfate tablets. The solution is applied in sixteen aliquots averaging 31.25 milliliters per aliquot. An amount of 255 grams of talc is used in the coating. The method of application is the same as described in Example 1.

After the three day drying period tablets prepared as indicated above were tested in artificial gastric juice, pH 1.2. It was found that about half of the tablets tested were slightly attacked by the fluid after a two hour period.

A second coating was applied. The coating solution contained fifty grams of the copolymer and ten grams of diethyl phthalate dissolved in sufficient denatured ethanol to make 335 milliliters of solution. This solution was applied to the tablets in 21 aliquots averaging approximately sixteen milliliters per aliquot. An amount of 198 grams of talc was used in the coating. The method of application was the same as described in Example 1. The tablets were dried for three days as described before.

After this second coating the tablets satisfactorily resisted artificial gastric juice in vitro and stayed intact in the stomach of dogs fed a normal diet for more than 7.5 hours.

EXAMPLE 4

*Enteric coated barium sulfate tablets*

A coating mixture is prepared by dissolving 37.5 grams of the copolymer (Preparation B) and 37.5 grams of cellulose acetate phthalate (Type S1 Eastman Kodak Co.) in equal parts of acetone and denatured ethanol to make 800 milliliters of solution then adding eighty grams of talc and 25 milliliters of liquid petroleum U.S.P.

This mixture is applied to 5000 subcoated barium sulfate tablets. The mixture is applied in 33 aliquots and 397 grams of talc are used as mineral solids, making a total of 477 grams of talc.

EXAMPLE 5

*Enteric coated tablet containing a combination of active materials*

4000 subcoated tablets containing 0.3 gram of ammonium salicylate, 0.3 gram of potassium p-aminobenzoate, and 5.5 milligrams of calcium pantothenate (see Table I) is coated with a solution containing 100 grams of copolymer (Preparation B) and twelve grams of dibutyl phthalate in sufficient denatured ethanol to make 640 milliliters of solution. The solution is applied in eighteen aliquots averaging approximately 35.5 milliliters per aliquot. An amount of 623 grams of talc is used in the coating. The tablets are dried for three days at approximately 105 degrees Fahrenheit. A second coating is applied with a solution containing fifty grams of copolymer and six grams of dibutyl phthalate in sufficient denatured ethanol to make 320 milliliters of solution. This second solution is applied in eight aliquots averaging forty milliliters per aliquot, and 318 grams of talc is used in the coating. The solutions are applied as described in Example 1. The tablets are dried for three days at approximately 105 degrees Fahrenheit.

An amount of 55 milligrams of ascorbic acid U.S.P. per tablet is laminated on the outside of the enteric coating and the tablets are sugar-coated in the usual manner.

EXAMPLE 6

*Enteric coated materials containing a combination of active materials*

5000 subcoated tablets containing 0.3 gram of ammonium salicylate, 0.3 gram of potassium p-aminobenzoate, and 5.5 milligrams of calcium pantothenate are coated with a solution containing 75 grams of hydrolyzed Resin SC-2 (Preparation F) and fifteen grams of dibutyl phthalate in sufficient denatured ethanol to make 700 milliliters of solution. The solution is applied in twenty aliquots averaging 35 milliliters per aliquot in a manner similar to that described in Example 1. An amount of 454 grams of talc is used in the coating. The tablets are dried for three days at approximately 105 degree Fahrenheit. A second coating is applied by use of a solution containing 37.5 grams of hydrolyzed Resin SC-2 and 7.5 grams of dibutyl phthalate in sufficient denatured ethanol to make 3.5 milliliters of solution. The solution is applied in six aliquots averaging 58.3 milliliters per aliquot. An amount of 255 grams of talc is used in the coating. The tablets are dried again for three days at approximately 105 degrees Fahrenheit.

An amount of 55 milligrams of ascorbic acid U.S.P. per tablet is laminated on the outside of the enteric coating and the tablets are sugar-coated in the usual manner.

EXAMPLE 7

*Enteric coated sodium salicylate tablets*

75 grams of hydrolyzed Resin SC-2 (Preparation E) and fifteen grams of glyceryl monooleate (Distillation Products Industries No. 115304) are dissolved in sufficient denatured ethanol to make 700 milliliters of solution.

This solution is applied to 5000 subcoated tablets containing five grains of sodium salicylate. The solution is applied in 29 aliquots averaging approximately 24 milliliters per aliquot. An amount of 623 grams of talc is used in the coating. The solution is applied and the tablets dried in the manner described in Example 1.

Similarly, a coating containing other mineral solids is prepared by substituting 623 grams of fuller's earth, barium sulfate, or kaolin for the talc used above. In each case the resulting coating possesses substantially the same properties as the talc coating.

EXAMPLE 8

*Enteric coated barium sulfate tablets*

12.5 grams of copolymer (Preparation C) is dissolved in 100 milliliters of a mixture of equal parts of acetone and denatured ethanol. 12.5 grams of starch acetate phthalate is dissolved in 100 milliliters of a mixture of equal parts of acetone and denatured ethanol. The first solution is poured with stirring into the second solution. 5.0 grams of dibutyl phthalate is dissolved in an equal amount of the above solvent mixture, and the solution is added to the polymer solution. The volume of the solution is made up to 250 milliliters by addition of equal parts of acetone and denatured alcohol then stirred until homogeneous. Eight milliliters of liquid petrolatum U.S.P. is added, and the solution is stirred very lightly.

This solution is applied to 1865 subcoated tablets of barium sulfate, three grains. The solution is applied in 24 aliquots averaging 10.75 milliliters per aliquot. 89 grams of talc is applied in the coating.

Similarly, a coating containing other mineral solids is prepared by substituting 89 grams of diatomaceous earth, bentonite, or calamine for the talc used above. In each case, the resulting coating possesses substantially the same properties as the talc coating.

EXAMPLE 9

*Enteric coated barium sulfate tablets*

25 grams of copolymer (Preparation C) and 2.5 grams of dibutyl phthalate are dissolved in a sufficient amount of a mixture of equal parts of acetone and denatured ethanol to yield 250 milliliters of solution. To this solution is added eight milliliters of liquid petrolatum U.S.P.

This solution is applied to 1850 subcoated tablets of barium sulfate, three grains. The solution is applied in nineteen aliquots averaging 13.6 milliliters per aliquot.

5.0 grams of starch acetate phthalate are dissolved in a mixture of 37.5 milliliters of methylethyl ketone and 12.5 milliliters of denatured ethanol. To this solution is added 2.0 milliliters of liquid petrolatum U.S.P. and 5.0 grams of talc. This mixture is applied in three aliquots to the above tablets immediately after the solution containing the copolymer has been applied. 105 grams of talc is used during the application of these two coats.

EXAMPLE 10

*Enteric coated pilules of prednisolone*

A mixture was prepared containing by weight: Prednisolone (9.0%), cane sugar powder U.S.P. (9.0%), starch, bolted (18.0%), talc, bolted (63.0%) and polyoxyethylene sorbitan monolaurate (1.0%).

White pill starters which were passed over a 40 mil screen and through a 50 mil screen, were found to have an average diameter of 40.0 mils for one lot and 40.3 mils for two other lots. An amount of 1.75 million of such starters were taken by weight and transferred to a conventional pill tub. An amount of two lbs., 142 grains of the mix representing about 54 percent of the weight of the starters was applied to the rolling starters using water from a spray gun. The resulting uncoated pilules were dried in an oven at about 105° F. A sample was then assayed, and if necessary the potency was corrected by further addition of a more concentrated mix containing only prednisolone and talc.

The drug-coated starters were then coated with hydrolyzed styrene-maleic anhydride copolymer coating solution using a mixture of four parts by weight of talc to one part by weight of another solid (magnesium stearate) in a conventional coating pan. A total of 300 grams of hydrolyzed styrene-maleic anhydride copolymer, 36 grams of dibutyl phthalate and 1120 grams of mineral solid was used. The resulting enteric coated pilules were dried for three days at 105° F. in an oven. A sample was assayed for prednisolone. These pilules were used in the subsequent experiments.

One of the unexpected features of the present invention is illustrated by Table VII which contains data showing that, when the coated pilules are placed in buffer solutions at various pH's, over ninety percent of the active ingredient, i.e. prednisolone, is released in two and one-half hours at a pH as low as 2.8. Release of the active ingredient at such a highly acid pH was previously thought undesirable for an enteric coated medicament.

*Table VII.—Percent of prednisolone released from SY-MA\* copolymer coated pilules to buffer solutions in various time intervals*

| pH | Percent released at indicated pH in indicated time | | | | | | | |
|---|---|---|---|---|---|---|---|---|
| | 1.2 | 2.0 | 2.4 | 2.6 | 2.8 | 3.4 | 6.0 | 7.5 |
| Time (hours): | | | | | | | | |
| 0.25 | | | | | | | 8.07 | |
| 0.33 | | | | | 13.96 | | 11.67 | 15.70 |
| 0.50 | | | | | 25.14 | 19.30 | 20.83 | |
| 0.67 | | | | | 37.62 | | 31.19 | 46.02 |
| 0.75 | | | | | | | 35.99 | |
| | | | | | | | (47.11) | |
| 1.00 | | 6.00 | 1.64 | 7.09 | 51.99 | | 55.89 | 64.23 |
| 1.50 | | | | 14.07 | | 67.61 | | |
| 2.00 | 2.30 | | 6.82 | 21.43 | 77.15 | | 87.79 | 93.24 |
| 2.50 | | | | 27.70 | | 91.88 | | |
| 3.00 | 4.20 | 7.88 | 12.79 | 32.33 | 92.56 | | 99.07 | 96.51 |
| 3.50 | | | | 34.24 | | 97.49 | | |
| 4.00 | 5.35 | 9.52 | 19.17 | 40.19 | 96.98 | | 100.00 | 99.13 |

*Hydrolyzed styrene-maleic anhydride.

DESCRIPTION OF APPARATUS AND PROCEDURE USED TO DETERMINE THE EFFECT OF BUFFER SOLUTIONS ON THE COATED PILULES

Exactly 100 ml. of the buffer solution was pipetted into each of four amber, oval 4 oz. bottles. The tightly-stoppered bottles were then placed in a constant temperature water bath at 37° C. for 30 minutes to allow for temperature equilibration. The bottles were clamped onto a rotary wheel which revolved at 6 r.p.m. Exactly 1.031 gm. of hydrolyzed styrene-maleic anhydride coated pilules was added to each of the four bottles which revolved in the bath for the indicated exposure periods. At the end of the specified times the buffer solutions were filtered through a Büchner funnel using Whatman No. 1 filter paper.

The buffer solutions used in this study were prepared as follows:

(1) pH 1.2—Dissolve 2.0 gm. of sodium hydroxide A.R. and 7.0 ml. of hydrochloric acid A.R. in deionized water to make 1,000 ml.
(2) pH 2.0—Add sufficient deionized water to 26.5 ml. of 0.2 N HCl and 125 ml. of 0.2 N NaCl to make 500 ml.
(3) pH 2.4—Add sufficient deionized water to 99.00 ml. of 0.2 N HCl and 125 ml. of 0.2 M potassium biphthalate to make 500 ml.
(4) pH 2.6—Add sufficient deionized water to 82.375 ml. of 0.2 N HCl and 125 ml. of 0.2 M potassium biphthalate to make 500 ml.
(5) pH 2.8—Add sufficient deionized water to 66.05 ml. 0.2 N HCl and 125 ml. of 0.2 M potassium biphthalate to make 500 ml.
(6) pH 3.4—Add sufficient deionized water to 24.875 ml. of 0.2 N HCl and 125 ml. of 0.2 M potassium biphthalate to make 500 ml.
(7) pH 6.0—Add sufficient deionized water to 14.0 ml. of 0.2 N NaOH and 125 ml. of 0.2 M potassium dihydrogen phosphate.
(8) pH 7.5—To 250 ml. of 0.2 M potassium dihydrogen phosphate add 190 ml. of 0.2 N NaOH and deionized water to make 900 ml. Check the pH, add sufficient NaOH solution to make pH 7.5, and make to 1000 ml.

PROCEDURE TO EXTRACT THE PREDNISOLONE FROM THE BUFFER SOLUTIONS

Exactly 25 ml. of the buffer solution was shaken in a separatory funnel with 50 ml. of chloroform A.R. for five minutes. Then 5 ml. of 25% aqueous sodium carbonate was added and the solution again shaken for five minutes. The chloroform layer was drawn off and filtered through Whatman No. 1 filter paper which had previously been washed with chloroform. After the buffer solution was extracted further with two 50 ml. portions of chloroform, the filter paper was rinsed with two 20 ml. portions of chloroform. The combined extracts and rinsings were collected in a 200 ml. volumetric flask which was made to volume with chloroform.

SPECTROPHOTOMETRIC PROCEDURE FOR ASSAYING THE QUANTITY OF PREDNISOLONE EXTRACTED BY THE BUFFER SOLUTIONS

Selected aliquots of the chloroform extraction in a 25 ml. or 125 ml. flask containing three glass beads were evaporated to dryness on a steam bath and with a vacuum tube inserted into the neck of the flask. After cooling and drying the flask in a vacuum desiccator, 10 ml. of absolute alcohol was added to dissolve the residue. To this solution 1.0 ml. of tetrazolium solution and 1.0 ml. of base solution were added in that order. Upon the addition of the base solution a timer was started and the color development was measured at 485 m$\mu$ 40, 50, and/or 60 minutes later using a Beckman Spectrophotometer Model B with the sensitivity set at 3.

Blank solutions consisted of 10 ml. of absolute alcohol plus 1.0 ml. each of the tetrazolium and base solutions. Standard solutions consisted of 10 ml. of an absolute alcohol solution of prednisolone (10 $\mu$g./ml.) to which was added 1.0 ml. of each of the reagent solutions.

Table VII presents data showing the percent of prednisolone released from 1.031 gm. of coated prednisolone pilules to the various buffer solutions in given time intervals, and illustrates a rapid change in disintegration of the pilules between pH 2.6 and 2.8.

That this property of the hydrolyzed styrene-maleic anhydride copolymer coated pilules is therapeutically desirable is illustrated by the data found in Tables VIII and IX. The data show the plasma 17-hydroxy steroid levels obtained following oral administration of prednisolone tablets and coated prednisolone pilules to ten "normal" human subjects. Absorption of the steroid after ingestion of the coated pilules was slower and continued over a longer period of time than that observed with the compressed tablets. Hence the coated pilules resulted in a sustained elevation of plasma 17-hydroxy steroid levels and thereby offer steroid medication over a prolonged period of time.

Table VIII.—Effects of C.T. prednisolone on plasma 17-hydroxy steroid levels in the human

| Subject | Control | Hours | | | | | |
|---|---|---|---|---|---|---|---|
| | | 1 | 2 | 4 | 6 | 7 | 8 |
| R.C | 15.0 | 44.3 | 32.6 | 25.5 | 12.2 | 17.0 | 10.2 |
| E.C | 15.9 | 57.3 | 29.8 | 17.4 | 14.3 | 8.9 | 8.2 |
| P.S | 9.4 | 44.9 | 39.0 | 33.9 | 20.7 | 22.3 | 14.6 |
| R.V | 9.7 | 42.0 | 40.1 | 40.7 | 23.8 | 18.4 | 7.6 |
| S.N | 11.2 | 49.0 | 39.2 | 39.8 | 20.2 | 11.1 | 9.1 |
| C.S | 10.6 | 33.8 | 28.1 | 11.3 | 8.2 | 5.6 | 4.8 |
| R.W | 3.4 | 64.2 | 40.3 | 39.6 | 41.7 | 9.2 | 22.4 |
| H.V | 13.3 | 31.4 | 25.7 | 22.4 | 10.2 | 0.4 | 4.3 |
| B.D | 18.3 | 50.4 | 22.8 | 35.7 | 30.5 | 22.4 | 17.4 |
| G.L | 23.3 | 23.4 | 47.2 | 46.9 | 23.1 | 18.2 | 23.6 |
| A.L | 23.6 | 51.1 | 39.2 | 21.5 | 27.9 | 18.9 | 21.9 |
| Avg.±S.E.M | 13.9±1.7 | 44.7±3.5 | 34.9±2.3 | 30.4±3.4 | 21.2±3.3 | 13.9±2.2 | 13.1±2.2 |

Table IX.—Effects of styrene-maleic acid coated prednisolone pilules on the plasma 17-hydroxy steroid levels in humans

| Subject | Control | Hours | | | | | |
|---|---|---|---|---|---|---|---|
| | | 1 | 2 | 4 | 6 | 7 | 8 |
| R.C | 10.3 | 25.5 | 34.9 | 37.4 | 29.7 | 18.6 | 27.9 |
| E.C | 22.7 | 15.6 | 29.9 | 26.6 | 24.3 | 14.5 | 21.3 |
| P.S | 21.1 | 9.9 | 20.1 | 30.2 | 27.5 | 24.0 | 24.3 |
| R.V | 15.3 | 18.8 | 14.2 | 0.0 | 20.8 | 13.3 | 10.2 |
| S.N | 0.8 | 10.9 | 17.4 | 29.5 | 14.1 | 12.6 | 14.5 |
| C.S | 16.4 | 21.3 | 12.5 | 18.2 | 38.6 | 27.5 | 38.9 |
| R.W | 6.5 | 12.7 | 3.2 | 25.1 | 21.2 | 29.1 | 21.1 |
| H.V | 15.2 | 18.9 | 16.1 | 29.7 | 28.2 | 18.8 | 28.2 |
| B.D | 15.7 | 22.5 | 43.2 | 31.0 | 37.5 | 34.6 | 12.2 |
| G.L | 13.9 | 15.3 | 10.2 | 16.0 | 25.5 | 34.4 | 22.8 |
| Avg.±S.E.M | 13.8±2.1 | 17.1±1.6 | 20.2±3.9 | 24.4±3.4 | 26.7±2.4 | 22.7±2.7 | 22.1±2.7 |

MATERIALS AND METHODS

All experiments were started at 8:00 A.M. and were performed on healthy male subjects. No subject received adrenal steroids more often than every 14 days. Following drug administration, six venous blood samples were taken over an 8-hour period. The steroid preparations were administered under blind label and each sample coded by a random selection of numbers.

Plasma 17-hydroxy steroids were determined by the method of Nelson and Samuels, J. Clin. Endo. and Metab. 12: 519, 1952. The results are expressed as gamma of 17-hydroxy steroids per 100 ml. plasma.

The preparations and dosages used are as follows:

(1) Compressed tablets of prednisolone 2–20 mg. tablets per dose.
(2) Coated prednisolone pilules, 2–20 mg. capsules, per dose, each capsule containing 1.031 grams of pilules or approximately 435 pilules per number 00 capsule.

RESULTS

With the oral administration of 40 mg. of compressed tablets to "normal" subjects, peak plasma levels were obtained in 1–2 hours (Table VIII) indicative of rapid absorption of the hormone. The plasma concentration returned to control levels at 6–7 hours.

When the steroid was administered as coated pilules, there was a slow, gradual elevation of plasma 17-hydroxy steroids during the first 6 hours, the peak level at this time was approximately 45% of that observed with the uncoated tablets. The clearance from the plasma was much slower and the concentrations remained elevated at the end of the experimental period.

It is to be understood that the invention is not to be limited to the exact details of operation or exact compositions shown and described, as obvious modifications and equivalents will be apparent to one skilled in the art, and the invention is therefore to be limited only by the scope of the appended claims.

This application is a continuation-in-part of Serial No. 496,350, filed March 23, 1955, now abandoned.

I claim:
1. A process for producing a medicament protected by an enteric material which includes the step of coating said medicament with a thin film comprising a finely divided mineral solid whose crystals are micaceous in form and having a particle size less than about fifty microns dispersed in a hydrolyzed styrene-maleic anhydride copolymer which is more than fifty percent hydrolyzed.

2. A process for producing a medicament protected by an enteric material which includes the step of coating said medicament with a finely divided mineral solid whose crystals are micaceous in form and having a particle size less than about fifty microns dispersed in a hydrolyzed styrene-maleic anhydride copolymer which is more than fifty percent hydrolyzed and has a molar ratio of monomers of between about one maleic acid residue to from one to about four styrene residues.

3. A process for producing a medicament protected by an enteric material which includes the steps of coating said medicament with a hydrolyzed styrene-maleic anhydride copolymer which is more than fifty percent hydrolyzed and a plasticizer, both dissolved in a polar, low-boiling solvent, and dusting with a finely divided mineral solid whose crystals are micaceous in form and having a particle size less than about fifty microns.

4. A process for producing a medicament protected by an enteric material which includes the step of coating said medicament with a mixture comprising hydrolyzed styrene-maleic anhydride copolymer which is more than fifty percent hydrolyzed, a plasticizer, and a finely divided mineral solid whose crystals are micaceous in form and having a particle size less than about fifty microns.

5. A process for producing a medicament protected by an enteric material which includes the step of coating said medicament with a mixture comprising hydrolyzed styrene-maleic anhydride copolymer which is more than seventy percent hydrolyzed, dibutyl phthalate, and finely divided talc having a mean surface diameter of about two microns (100 percent finer than thirty microns) a specific surface of 10,710 square centimeters per gram and a specific gravity of 2.76.

6. A medicament protected by an enteric material comprising a finely divided mineral solid whose crystals are micaceous in form and having a particle size less than about fifty microns dispersed in a hydrolyzed styrene-maleic anhydride copolymer which is more than fifty percent hydrolyzed and the non-toxic, water soluble salts of the copolymer.

7. A medicament protected by an enteric material comprising a finely divided mineral solid whose crystals are micaceous in form and having a particle size less than about fifty microns dispersed in a hydrolyzed styrene-maleic anhydride copolymer which is more than fifty percent hydrolyzed and has a molar ratio of monomers of between about one maleic acid residue to from one to about four styrene residues, and the ammonium and alkali-metal salts of the copolymer.

8. The enteric medicament of claim 7 in which the copolymer is more than seventy percent hydrolyzed and has a molar ratio of monomers of between about one maleic acid residue to from one to about 1.2 styrene residues.

9. A medicament protected by an enteric material comprising a finely divided mineral solid whose crystals are micaceous in form and having a particle size less than about fifty microns dispersed in a film-forming copolymer represented by the following structural formula:

$$\{Rx\text{---}Xy\}_n$$

wherein R represents homopolymerizable ethylenic units of which more than seventy percent are styrene units, X represents ethylenic units of maleic acid and maleic anhydride of which more than fifty percent are maleic acid units, and $$\frac{x}{y}$$

equals from one to about four.

10. A medicament protected by an enteric material comprising a finely divided mineral solid whose crystals are micaceous in form and having a particle size less than about fifty microns dispersed in a film-forming copolymer represented by the following structural formula:

$$\{Rx\text{---}Xy\}_n$$

wherein R represents homopolymerizable ethylenic units of which more than seventy percent are styrene units and the others are selected from the group consisting of acrylonitrile, acrylic acid, methacrylic acid, itaconic acid, vinyl chloride, and vinylidene chloride, X represents ethylenic units of maleic acid and maleic anhydride of which more than seventy percent are maleic acid units, and $$\frac{x}{y}$$

equals from one to about 1.2.

11. A medicament coated with a mixture possessing enteric properties and comprising hydrolyzed styrene-maleic anhydride copolymer which is more than fifty percent hydrolyzed, a plasticizer, and a finely divided mineral solid whose crystals are micaceous in form and having a particle size less than about fifty microns.

12. A medicament coated with a mixture possessing enteric properties and comprising hydrolyzed styrene-maleic anhydride copolymer which is more than seventy percent hydrolyzed, dibutyl phthalate, and finely divided talc having a mean surface diameter of about two microns (100 percent finer than thirty microns), a specific surface of 10,710 square centimeters per square inch, and specific gravity of 2.76.

13. An enteric coating composition which comprises a finely divided mineral solid whose crystals are micaceous in form and having a particle size less than about fifty microns dispersed in a hydrolyzed styrene-maleic anhydride copolymer which is more than fifty percent hydrolyzed.

References Cited in the file of this patent

UNITED STATES PATENTS

| | | |
|---|---|---|
| 2,047,398 | Voss et al. | July 14, 1936 |
| 2,066,105 | Hagedorn et al. | Dec. 29, 1936 |
| 2,702,264 | Klaui | Feb. 15, 1955 |

FOREIGN PATENTS

| | | |
|---|---|---|
| 644,759 | Germany | May 12, 1937 |